Figure 1:
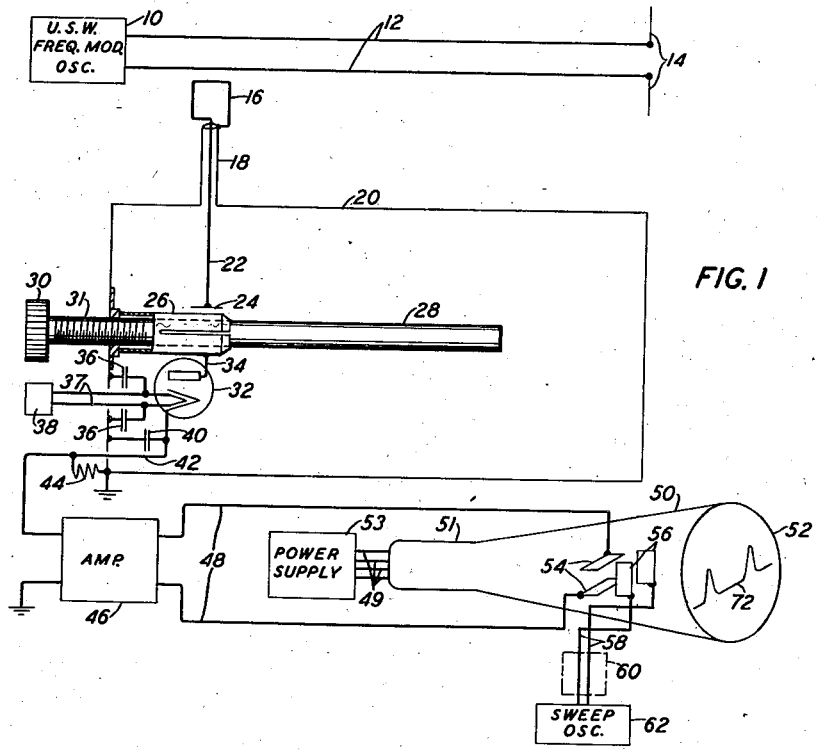

Oct. 22, 1940.          R. C. NEWHOUSE          2,218,923
MEASUREMENT OF FREQUENCY MODULATED WAVES
Filed July 26, 1939

INVENTOR
R. C. NEWHOUSE
BY
H. O. Wright
ATTORNEY

Patented Oct. 22, 1940

2,218,923

UNITED STATES PATENT OFFICE 2,218,923

MEASUREMENT OF FREQUENCY MODULATED WAVES

Russell C. Newhouse, Orange, N. J., assignor to Bell Telephone Laboratories, Incorporated, New York, N. Y., a corporation of New York Application July 26, 1939, Serial No. 286,496

7 Claims. (Cl. 179—171.5)

This invention relates to an improved method and apparatus for determining the frequency range of the modulation of a frequency modulated wave.

An object of the invention is to provide an improved method and apparatus for determining the frequency range over which the frequency of a frequency modulated ultra-short wave is varied.

A further object is to permit measurements to be made upon a system operating in its normal manner without substantially affecting the system's operation.

Other objects will appear during the course of the following description and in the appended claims.

By way of illustration, the method of this invention has been found to have exceptional merit in facilitating the accurate adjustment of frequency modulated ultra-short wave systems of the type employed in the radio frequency altimeter described in my copending application, Serial No. 240,739, filed November 16, 1938. This altimeter employs an ultra-short wave normally having a mean frequency of approximately 432.5 megacycles which is continuously modulated in frequency between limiting frequencies approximately 12½ megacycles above and below the mean frequency, respectively, that is, from approximately 420 to 445 megacycles. The modulation is produced by a motor driven variable condenser in the plate-grid circuit of the transmitter. As described in my copending application, the beat-note frequency, which indicates the altitude, is a function of the frequency modulating interval. It is therefore necessary in calibrating altimeters of this type to accurately determine the extreme frequencies of the modulation range.

To avoid the inaccuracies almost inevitably encountered in attempting to set the rotating condenser at maximum and minimum capacity points for static measurements of constant frequencies and to avoid the tediousness incident to such methods of measurement, as well as to permit measurements to be taken easily and under truly representative operating conditions, the method of this invention was devised.

Stated concisely, the method of this invention comprises deriving a small amount of energy from the source of the frequency modulated ultra-short wave, introducing this energy into a calibrated, adjustable, sharply-tuned circuit, detecting the output from the tuned circuit, adjusting the tuned circuit to obtain upon a suitable response indicator two full frequency response curves of said tuned circuit for each full cycle of frequency modulation, further adjusting the frequency of the tuned circuit in one direction until a single full response curve only for each full cycle of frequency modulation is obtained, noting the adjustment for this single response curve, further adjusting the tuned circuit in the opposite direction with respect to its frequency of resonance until a second adjustment at which a single full response curve only, for each full cycle of frequency modulation is obtained, noting this second adjustment and determining from the calibration of said tuned circuit the frequencies at which a single full response curve only for each full cycle of frequency modulation is obtained.

The apparatus employed in an illustrative embodiment of the invention described in detail hereinafter comprises a calibrated, adjustable, sharply-tuned circuit loosely coupled to the source of frequency modulated ultra-short waves to be measured, a detector loosely coupled to the output of the tuned circuit, a cathode ray oscillograph having horizontal and vertical deflecting plates, means for causing the ray of the oscillograph to trace a horizontal path once for each time period required by an integral number of full cycles (usually one) of frequency modulation, means for causing the ray to be deflected vertically by the detected output from the tuned circuit and means for changing the phase relation between the modulation cycles and the horizontal sweeping motion of the oscillograph.

Numerous other embodiments of the principles of the invention will occur to those skilled in the art and no attempt has here been made to be exhaustive.

Figure 2:
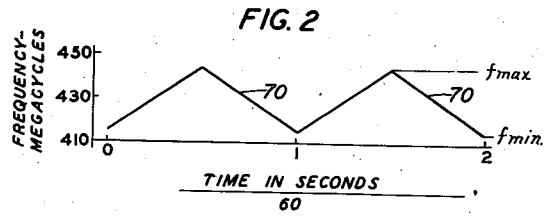

The operation of the illustrative system and the principles of the invention will become more clearly apparent from the following detailed description and the accompanying drawing, in which:

Fig. 1 shows in schematic diagram form an ultra-short wave frequency modulated system and a system embodying the principles of this invention for determining the frequency range of the modulation of the ultra-short wave;

Fig. 2 illustrates a type of frequency modulation assumed for purposes of illustration for the ultra-short wave system of Fig. 1; and Figs. 3 to 6, inclusive, show cathode ray oscillograph patterns, where the horizontal sweeping time is that of one full frequency modulating cycle, for a series of adjustments of the tuned circuit whereby the extreme frequencies of the range of modulating frequencies may be determined in accordance with the principles of the invention.

In more detail, Fig. 1 represents, diagrammatically, a preferred embodiment of a system of this invention associated with an ultra-short wave frequency modulated system, the frequency range of the modulation of which it is desired to determine.

In Fig. 1 oscillator 10 generates ultra-short waves which are frequency modulated. By way of example, assume that as for the altimeter of my above-mentioned application, the oscillator 10 is generating a wave having a mean frequency of approximately 432.5 megacycles, frequency modulated about this mean value by approximately ±12.5 megacycles at a rate of sixty times per second. If the variation in frequency is further assumed to be a straight line function of time it may be represented by the regular curve 70 of Fig. 2.

In Fig. 1 exploratory loop 16 is positioned so that a small amount of energy from oscillator 10 is induced therein. This energy is conveyed by concentric line 18, having inner conductor 22, into vessel 20. Vessel 20 with rod 28 forms a quarter wave-length line, short-circuited at the left end, and open-circuited at the right end of vessel 20, as shown. The length of rod 28 within vessel 20 may be accurately adjusted by micrometer head 30 and its position of adjustment may be accurately read upon an appropriate scale 31. A diode detector 32 is placed within vessel 20 at the short-circuited end of the line. By-pass condensers 40 and 36, connecting to the left end of tank 20, prevent ultra-high frequency energy from leaving vessel 20 along cathode lead 42 (carrying the direct current output of diode 32) or the heater leads 37 which carry suitable heater current from power source 38 to the diode cathode heating element. Input lead 22 terminates in a plate 24 which is arranged to have suitable capacity with respect to a spring contact member 26 encircling rod 28 to provide a sufficiently loose coupling to rod 28 that the resonance of rod 28 and vessel 20, as a quarter wave-length line, will not be sensibly affected. The adjustments afforded by axial movement of rod 28 should be sufficient to tune the line comprising rod 28 and vessel 20 to resonate at any frequency within the range throughout which it is desired to make measurements. Lead 42 connects to the resistance 44. The diode output serves to produce a direct voltage drop across resistance 44 which becomes a maximum when the input frequency for exploring coil 16 coincides precisely with the frequency of resonance to which vessel 20 and rod 28 are adjusted.

The combination of line 18, 22, vessel 20, rod 28, diode detector 32 and associated apparatus mentioned above comprises, in part, the subject-matter of a copending application of W. H. C. Higgins Serial No. 286,681 filed July 26, 1939, covering an ultra-short wave frequency indicator, and assigned to the same assignee as the present application. In the copending application of Higgins the preferred proportions and arrangement of the parts of the frequency indicator will be found. The representations in the drawings of this application relating to the frequency indicator, per se, are purely diagrammatic.

In accordance with the principles of the present invention, the voltage developed across resistance 44 is further amplified, to such an extent as may be found desirable, in amplifier 46 and is then impressed across the vertical deflecting plates 54 of a cathode ray tube 50. An appropriate voltage from a sweep oscillator 62 is impressed across the horizontal deflecting plates 56 of tube 50. The sweep oscillator 62 is approximately synchronized with the frequency modulating cycle of the ultra-short wave under observation so that the cathode ray traverses its horizontal path during the time interval required for a full cycle of frequency modulation. (If desired an integral number of full cycles of frequency modulation greater than one may be used.)

For the wave whose frequency modulation is represented in Fig. 2 the time interval is 1/60 second for each full cycle of modulation.

If desired, an adjustable phase changing network 60 may be interposed between oscillator 62 and deflecting plates 56 so that the position of the patterns on the target 52 of tube 50 may be adjusted horizontally. In measurements on the altimeter transmitter mentioned above a change in the phase relation between the sweep oscillator voltage and that derived from the transmitter was effected simply by momentarily turning off either oscillator.

If the sweep oscillator is not precisely synchronized with the modulation cycle the pattern will travel horizontally across the target 52. Providing the rate of such travel is relatively slow, this will not be found objectionable, as will become apparent hereinafter. Various methods of locking the sweep oscillator into synchronism with the cycle over which recurrent phenomena are being observed are well known to those skilled in the art and may obviously be employed with the systems of this invention, if desired.

In the left end of tube 50, any one of numerous well-known arrangements of ray producing and focusing devices may be employed and suitable power supplied thereto by leads 49 from an appropriate power source 53.

Figure 3:
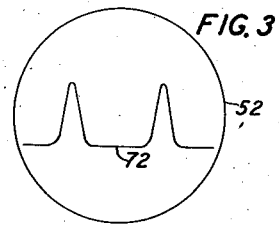

In the following the method of the present invention, assuming by way of illustration that the modulation of the wave illustrated by Fig. 2 is to be measured, rod 28 is adjusted until a pattern such as curve 72 of Fig. 3, showing two full resonance curves of the tuned circuit is obtained. This pattern, of course, indicates that rod 28 has been adjusted so that the resonance of vessel 20 and rod 28 occurs at some frequency intermediate the limiting frequencies $f_{min.}$ and $f_{max.}$ of the modulating range. A full resonance pattern is therefore obtained for each half of the modulating cycle as the frequency varies from one limiting frequency to the other and back to the first limiting frequency again.

Figure 4:
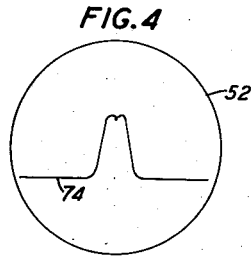
Figure 5:
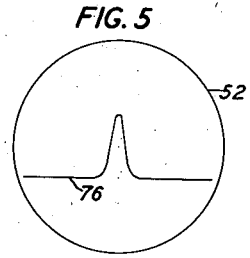

Upon further adjustment of rod 28 in one direction these two response curves will be observed to come closer to each other and as the resonance of the frequency indicator, including vessel 20 and rod 28, closely approaches one of the limiting frequencies of the modulating range ($f_{max.}$ or $f_{min.}$ as will be apparent from the direction in which rod 28 is being adjusted) the two resonance patterns start to merge into a "butterfly" or double-tipped single pattern as shown in curve 74 of Fig. 4.

The butterfly pattern indicates that the frequency variation or modulation range does not include the entire range of frequencies necessary to trace a full response curve of the frequency indicator but that a part of the response curve is falling outside the modulation range, i. e., beyond the limiting frequency toward which adjustment is being made. When exactly half of the response curve is caused to fall outside the range, the butterfly pattern will appear to have merged into a single full response curve, as shown in curve 76 of Fig. 5. Actually only half of the response curve is now being traced and is repeated as the direction of frequency modulation reverses at the limiting frequency and sweeps back through the same frequency range by which it approached the limiting frequency. The adjustment of rod 28 for which this single, apparently full response curve is obtained should be noted and the calibration of the frequency indicator may then be consulted to determine the limiting frequency to which the frequency indicator was adjusted.

Figure 6:
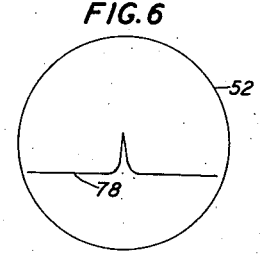

In case the adjustment of rod 28 is carried too far, then less than half of the full response curve will be traced and when repeated, because of the frequency reversal at the limiting frequency, a more sharply pointed curve, as shown in curve 78 of Fig. 6, of less amplitude than a normal response curve will be obtained.

Having determined the limiting frequency at one end of the modulating range as above described, the other limiting frequency is determined in like manner, the sole difference being that rod 28 is adjusted by turning it in the opposite direction until first two separate response curves, then the butterfly curve and finally the single full response curve are obtained in turn on the target of the cathode ray tube and the adjustment of rod 28 is again noted. In seeking the other limiting frequency a change of the phase relation between the sweep circuit oscillator voltage and that of the apparatus under test may be found desirable to bring the patterns under observation into a favorable position on the target 52 of the cathode ray tube 50. As mentioned above, this may be effected by momentarily turning off one of the oscillators or by introducing a definite phase change in the output circuit of one of them.

Obviously the method of the invention may be readily extended to provide indications of the relative amplitudes of each of the several frequencies within the modulating range and tuned circuits and indicators of a number of types other than those shown in the above embodiment may be employed without departing from the spirit of the invention, the scope of which is defined in the appended claims.

What is claimed is:

1. A system for determining the extent of the frequency modulation of a frequency modulated ultra-short wave which includes means for producing an electron stream, means for causing said electron stream to sweep a particular substantially linear path on an electron sensitive target at an approximately uniform velocity once for each complete cycle of frequency modulation, means for deriving a small amount of energy from said wave, said means including a calibrated sharply resonant adjustable circuit, means for detecting the energy output of said circuit and applying it to produce substantially normal deviation of said electron stream from said linear path, means for adjusting the tuning of said resonant circuit until a full resonant curve thereof is traced by said electron stream for each half of the said frequency modulation cycle, means for further adjusting the tuning of said resonant circuit in one direction until the said full resonant curves just merge into a single full resonant curve, means for determining the setting of said tuned circuit for said merged condition, means for adjusting the tuning of said resonant circuit in the opposite direction until said full resonant curves just merge a second time into a single full resonant curve, means for determining the setting of said tuned circuit for said second merged condition whereby from the calibration of said tuned circuit the frequencies corresponding to said first and said second merged conditions may be determined.

2. Means for determining the limiting frequencies of the range of the frequency modulation of a frequency modulated ultra-short wave, comprising a calibrated adjustable tuned circuit, a detector coupled through said tuned circuit to a source of said wave, and means for determining precisely the adjustment of said tuned circuit for which half of the frequency response of said tuned circuit falls outside the range of frequency modulation.

3. Means for determining the range of the frequency modulation of a frequency modulated ultra-short wave comprising a calibrated adjustable tuned circuit, an ultra-high frequency detector coupled through said tuned circuit to a source of said wave, a cathode ray tube having an electron stream producing system and a first pair of deflecting plates mounted on an axis passing through the normal path of said stream and a second pair of deflecting plates mounted on an axis passing through the normal path of said stream at an angle with respect to the first-named axis, a coupling between the output of said detector and said first pair of plates and means coupled to said second pair of plates for deflecting said electron stream to traverse a predetermined distance parallel with the axis of said second plates once for each complete cycle of modulation of said wave.

4. In a system for measuring the frequency modulation of ultra-high frequency waves, the combination comprising a section of concentric line short-circuited at one end and open-circuited at the other, the effective length of the inner conductor being adjustable and being provided with micrometric means for determining its adjustment, the line being continuously adjustable to be resonant at any frequency within the range at which measurements are to be made, means for loosely coupling said line with a source of the modulated wave to be measured, a detector loosely coupled to said line, a cathode ray oscillograph having horizontal and vertical deflecting plates and a target, means coupled to the said horizontal plates for deflecting the ray to recurrently sweep a particular horizontal distance during a time interval equal to the time interval required for at least one complete cycle of modulation of the wave to be measured, means for altering the timing relation between the modulation cycle and the recurrent horizontal sweeping motion of the ray and means for coupling the output of said detector to said vertical plates.

5. The method of determining an extreme frequency of a frequency modulated wave which comprises selecting a narrow band of frequencies within the range of modulation, providing an indication of the distribution of energy within said narrow frequency band, and adjusting the position of the said narrow band of frequencies with respect to the range of modulation until the distribution of energy in said narrow band of frequencies is substantially just confined to frequencies on one side of the mid-frequency of said narrow band whereby an indication of the value of an extreme frequency of said range of modulation may be obtained.

6. A system for determining an extreme frequency of a frequency modulated wave comprising means for selecting a narrow band of frequencies within the range of modulation, means for determining the distribution of energy within said narrow frequency band, means for adjusting the position of the narrow band of frequencies selected with respect to the range of modulation until the distribution of energy in said narrow band of frequencies is substantially confined to frequencies on one side of the mid-frequency of said narrow band and means for determining the mid-frequency of said narrow band for said latter adjustment.

7. The method of determining an extreme frequency of a frequency modulated wave comprising selecting a narrow band of frequencies within the range of modulation, providing an indication of the energy response within said narrow band and adjusting the position of said narrow band toward an extreme frequency of said range until the indicated response within said narrow band is substantially half its initial magnitude whereby an indication of the value of an extreme modulating frequency of said range of modulation may be obtained.

RUSSELL C. NEWHOUSE.